US005553548A

United States Patent [19]

Eaton

[11] Patent Number: 5,553,548

[45] Date of Patent: Sep. 10, 1996

[54] SYSTEM AND METHOD FOR MOVING AN OCCUPIED WHEELCHAIR BETWEEN TWO LEVELS

[76] Inventor: Kenneth C. Eaton, 1114 Cathcart Boulevard, Sarnia, Ontario, Canada, N7S 2H5

[21] Appl. No.: 420,771

[22] Filed: Apr. 12, 1995

[51] Int. Cl.$^{6}$ .................................. B62B 9/02; B61J 3/04

[52] U.S. Cl. .......................... 104/183; 105/72.2; 187/201; 280/250.1; 280/304.1

[58] Field of Search ................................ 104/173.1, 178, 104/183; 105/72.2; 187/200, 201; 280/250.1, 304.1

[56] References Cited

U.S. PATENT DOCUMENTS

| | | | |
|---|---|---|---|
| 4,865,344 | 9/1989 | Romero et al. | 280/304.1 |
| 5,050,708 | 9/1991 | Wood | 187/201 |
| 5,363,771 | 11/1994 | Warren et al. | 105/72.2 |
| 5,470,093 | 11/1995 | Kiser | 280/304.1 |

FOREIGN PATENT DOCUMENTS

| | | |
|---|---|---|
| 5820271 | 2/1983 | Japan . |
| 6043678 | 3/1985 | Japan . |
| 464585 | 2/1992 | Japan . |

*Primary Examiner*—S. Joseph Morano
*Attorney, Agent, or Firm*—Daryl W. Schnurr

[57] ABSTRACT

A method and device for moving an occupied wheelchair between two levels involves tracks mounted on stairs and a pull cable that is substantially aligned with the center of gravity of the chair and is anchored above the upper level. The tracks have a transition section between the lower level and a main slope of the tracks. The device can be used by a wheelchair occupant to ascend or descend the stairs without assistance from any other person. The cable has a winch which can be manually operated by the wheelchair occupant or power operated and controlled by a remote control in the hands of the wheelchair occupant. Previously, wheelchair occupants are moved between two different levels by ramps or elevators.

31 Claims, 3 Drawing Sheets

FIG. 1
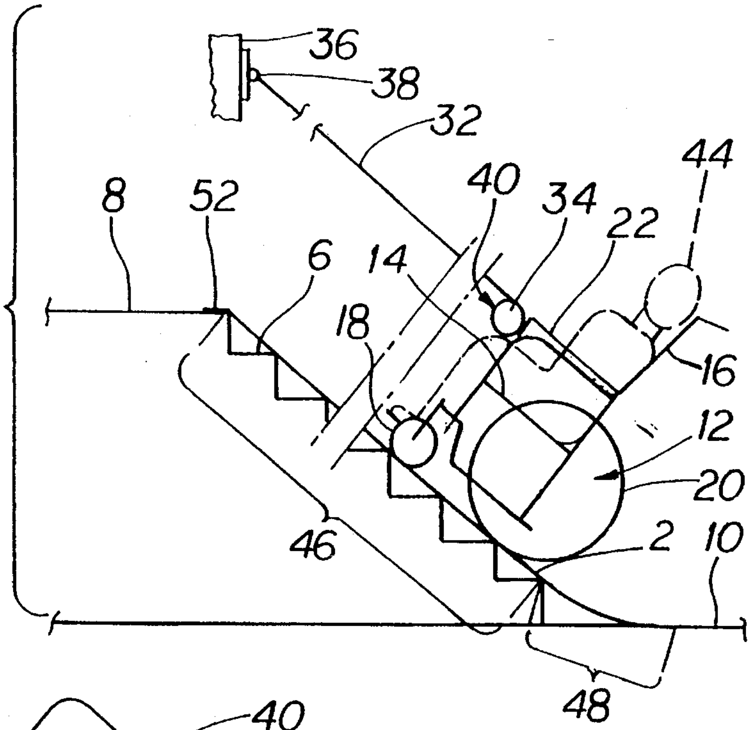
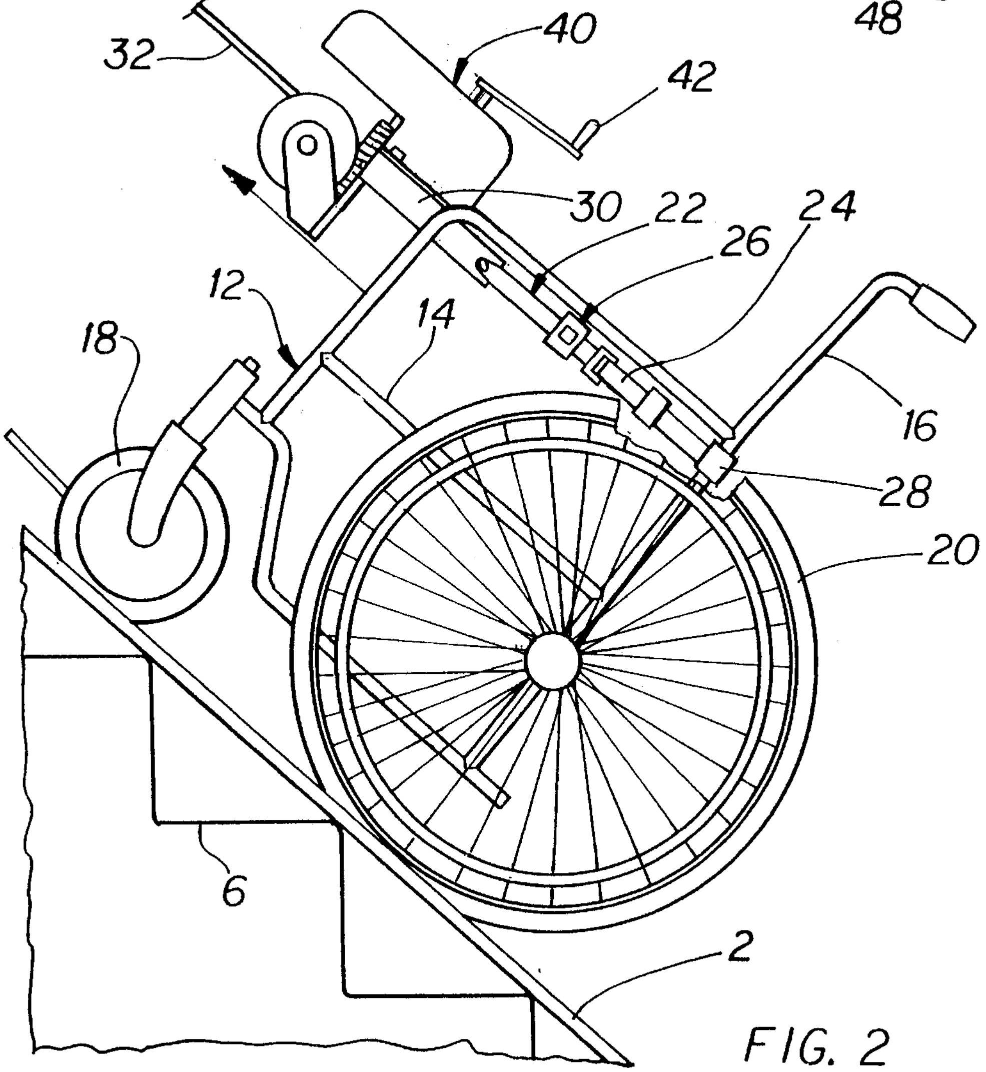
FIG. 2

SYSTEM AND METHOD FOR MOVING AN OCCUPIED WHEELCHAIR BETWEEN TWO LEVELS

BACKGROUND OF THE INVENTION

1. Field of the Invention

This invention relates to a method and device for moving a wheelchair occupied by an occupant between two levels. More particularly, the method and device operates on tracks that are mounted on stairs and the occupant can move between said levels without assistance from any other person.

2. Description of the Prior Art

It is known to use ramps to move wheelchairs between two levels. However, in many structures and particularly in residential dwelling units, there is often not sufficient space to install a ramp with an appropriate slope to allow wheelchair occupants to enter or leave the building. For example, in a garage connected to a residence there is often insufficient space for a ramp. It is also known to have individual elevators, which can be installed adjacent to stairs, and are sometimes used to move wheelchair occupants from one level to another. However, the wheelchair occupant must leave the wheelchair on one level, use the elevating device and subsequently exit from the elevating device onto another wheelchair or the same wheelchair that has been transported between the two levels by a third party. It is known to mount tracks on stairs to manually move a baby buggy up or down the stairs. See U.S. Pat. No. 2,312,273.

SUMMARY OF THE INVENTION

It is an object of the invention to provide a method and device to move an occupied wheelchair between two levels where the device can be operated and the method carried out entirely by a wheelchair occupant.

A method of moving a wheelchair occupied by an occupant between an upper level and a lower level, said wheelchair having a front, two front wheels, two rear wheels, a seat and a back, said wheelchair moving along tracks having a main slope, said tracks being spaced apart so that each track receives a front wheel and a rear wheel of said chair, said tracks having guide means thereon to prevent the chair from slipping off either of said tracks, winding means that can be removably secured to said chair at a height substantially through a center of gravity of said chair and occupant, a cable having an upper end and a lower end, said lower end being connected to said winding means and said upper end being securely anchored above and beyond said upper level, said upper end being anchored so that said cable is substantially parallel to said main slope when said chair is on said tracks, said method comprising:

(a) commencing with the chair at the lower level, moving said chair to align said front wheels of said chair with said tracks, connecting said winding means to said chair, operating said winding means to tighten said cable until said cable is taut, continuing to operate said winding means to retract said cable and to pull said chair in a forward motion onto said tracks and gently up said main slope, with said cable substantially parallel to said tracks, until said chair exits from said tracks onto said upper level and releasing said winding means from said chair;

(b) commencing with the chair at said upper level, orienting said chair to align said rear wheels of said chair with said tracks and backing said chair towards said tracks, attaching said winding means to said chair at a height substantially through a center of gravity of said chair and said occupant, operating said winding means to extend said cable slightly, moving said chair backward along said tracks until rear wheels of said chair are on said main slope, when said cable is taut further operating said winding means to extend said cable to allow said chair to move rearwards gently down said main slope with said cable substantially parallel to said main slope until said chair exits from said tracks onto said lower level and releasing said winding means from said chair.

In a further embodiment, a method of moving an occupied wheelchair between an upper level and a lower level, said wheelchair having a front, two front wheels, two rear wheels, a seat and a back, said wheelchair moving along tracks having a main slope, said tracks being spaced apart from one another so that each track receives a front wheel and a rear wheel of said chair, said tracks having guide means thereon to prevent said chair from slipping off either of said tracks, a cable having an upper end and a lower end, said upper end being anchored above and beyond said upper level, said lower end being connected to retention means, said retention means being removably connected to said chair so that said cable is substantially parallel to said main slope and substantially through a center of gravity of said chair and said occupant when said chair is on said main slope, said cable being connected to motorized winding means, with control means for said winding means, said method comprising:

(a) commencing with the chair at the lower level, moving said chair to align said front wheels of said chair with said tracks, connecting said retention means to said chair, operating said control means to control said winding means to retract said cable until said cable is taut, continuing to operate said control means to cause said winding means to retract said cable to pull said chair in a forward motion onto said tracks and gently up said main slope with said cable substantially parallel to said tracks until said chair exits from said tracks onto said upper level and releasing said retention means from said chair;

(b) commencing with the chair at said upper level, orienting said chair to align said rear wheels of said chair with said tracks and backing said chair towards said tracks, connecting said retention means to said chair, operating said control means so that said cable has a small amount of slack, moving said wheelchair onto said tracks so that said rear wheels move slightly down said main slope as said cable becomes taut, operating said control means to extend said cable to allow said wheelchair to move rearward gently down said main slope until said chair exits from said tracks onto said lower level and releasing said retention means from said chair.

A system for moving a wheelchair supporting an occupant between an upper level and a lower level moves said wheelchair along sloped tracks. The sloped tracks have a main slope. The tracks are spaced apart from one another so that each track receives a front wheel and a rear wheel of said chair. The tracks have guide means around to prevent the chair from slipping off either of said tracks, said chair having a seat and back. The system comprises said tracks together with winding means and cable, said winding means being removably connected to said chair so that said cable is substantially parallel to said track when said chair is on said main slope and said cable extends substantially through a center of gravity of said occupant and said chair. The winding means is connected to a lower end of said cable. The cable has an upper end that is anchored above and beyond said second level so that as said chair moves up or down said tracks, said cable is substantially parallel to said main slope and said tracks.

A system for moving a wheelchair supporting an occupant between an upper level and a lower level moves the wheelchair along sloped tracks. The tracks have a main slope and are spaced apart from one another so that each track receives a front wheel and a rear wheel of said chair. The tracks have guide means thereon to prevent the chair from slipping off either of said tracks, said chair having a seat and back. The system comprises said tracks together with retention means, winding means, control means and a cable. The retention means is connected to said chair. The cable has an upper end and a lower end with said lower end being connected to said retention means. The upper end is anchored above and beyond said second level so that as the chair moves up or down said tracks on said main slope, said cable is substantially parallel to said tracks and extends substantially through a center of gravity of said chair and said occupant. The winding means is motorized and the control means controlling said winding means to retract and extend said cable.

BRIEF DESCRIPTION OF THE DRAWINGS

In the drawings:

FIG. 1 is a schematic partial side view of an occupied wheelchair supporting an occupant as the chair moves up or down a main slope;

FIG. 2 is a partial side view of a wheelchair on a main slope of tracks mounted on stairs with the occupant omitted;

DESCRIPTION OF A PREFERRED EMBODIMENT

Figure 3:
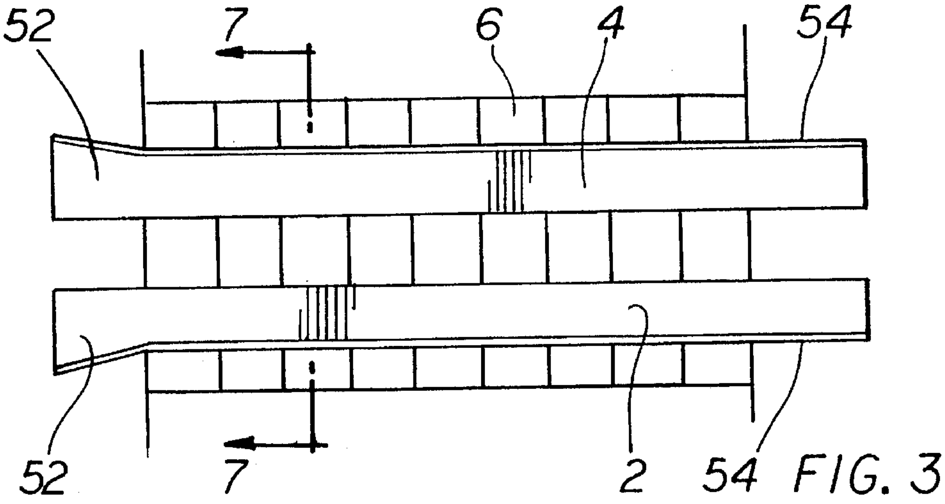
FIG. 3 is a top view of tracks mounted on stairs.

In FIGS. 1, 2 and 3, two tracks 2, 4 are mounted on stairs 6 between an upper level 8 and a lower level 10. A wheelchair 12 has a seat 14, a back 16, two front wheels 18 (only one of which is shown) and two rear wheels 20 (only one of which is shown). A harness 22 having belts 24 and connectors 26 extends around the back 16 of the chair and is held at a particular height by brackets 28 (only one of which is shown). The rear wheel 20 of the wheelchair 12 is partially cut-away in FIG. 2 to expose the bracket 28. The bracket 28 can be of various shapes so long as it retains the harness at a height that is aligned with a center of gravity of the wheelchair and occupant when the wheelchair is on the main slope. For example, the brackets 28 could be U-shaped or D-shaped with a suitable slit at or near an upper end thereof to allow the seatbelt 24 to be inserted into the bracket and to make it more difficult to remove the seatbelt from the bracket. The belts are connected to a spreader bar 30. Many users of the device will choose to leave the belts 24 connected to the wheelchair at all times and simple disconnect the spreader bar 30 by disconnecting the connectors 26. A cable 32 has a lower end 34 and an upper end 36. The upper end 36 is connected to an anchor 38 above and beyond the upper level 8. In FIG. 1, the anchor 36 and upper end 38 of the cable 32 are shown schematically. The anchor 38 can be connected to a vertical wall, a ceiling or other convenient anchoring location so long as the anchor is located above and beyond the upper level 8. Preferably, the anchor 38 will be wide enough to be connected to two supports (i.e. joists) in the wall or ceiling to which it is connected. In FIG. 1, the anchor is shown to be vertically above the upper part of the stairs 6. The anchor must be located above and beyond the upper level 8 so that the cable 32 can continue to pull the wheelchair off the main slope 46 and onto the upper level 8. In the position of the anchor (which position was chosen for ease of illustration) shown in FIG. 1, the cable would be located vertically above the wheelchair while the wheelchair remained on the main slope. By locating the anchor, for example, three or four feet beyond the upper end of the stairs 6, there would be sufficient room to pull the wheelchair onto the upper level 8. The anchor can be located on a wall or ceiling or any convenient location. The lower end 34 of the cable 32 is connected to a winch 40 having a handle 42. As the handle is turned in an appropriate direction by a wheelchair occupant 44, the cable 32 is extended or retracted and the wheelchair moves respectively down or up the tracks 2, 4. The tracks 2, 4 have a main slope 46 and a transition section 48. The transition section 48 has an appropriate vertical radius so that there is sufficient downward force on each wheel of the chair at all times when the chair is on said tracks. If the vertical radius of the transition section 48 is too small, the front wheels of the chair will tend to lift off the tracks in the transition section. A vertical radius of 48" is believed to be satisfactory for most wheelchairs. An upper portion 52 of the tracks bends onto the upper level 8.

From FIG. 3, it can be seen that the tracks have a vertical outer edge 54 which provide guide means to prevent the chair from slipping off either of the tracks. At the upper portion 52, it can be seen that the outer edges 54 diverge from one another. The divergence makes it easier for a wheelchair occupant to orient the chair so that the rear wheels enter onto the tracks when the occupant desires to move down the stairs on the wheelchair. Though a smoothly curved transition section 48 is preferred, the transition section could be a series of segments (i.e. straight sections) of track to provide a transition between the lower level 10 and the main slope 46. It should be noted that the center of gravity of an occupied wheelchair will vary with the type of wheelchair and also the weight and stature of the occupant of the wheelchair. In FIG. 1, the harness 22 is located at a higher level on the wheelchair than the harness 22 of FIG. 2. The harness was shown at two different levels as the center of gravity will vary. It can be seen from FIGS. 1 and 2 that the harness 22 is aligned with the cable 32. When there is a pulling force applied to the cable 32, the cable 32 will align itself with the harness 22 and the spreader bar 30 will tilt up or down to permit this alignment.

Figure 4:
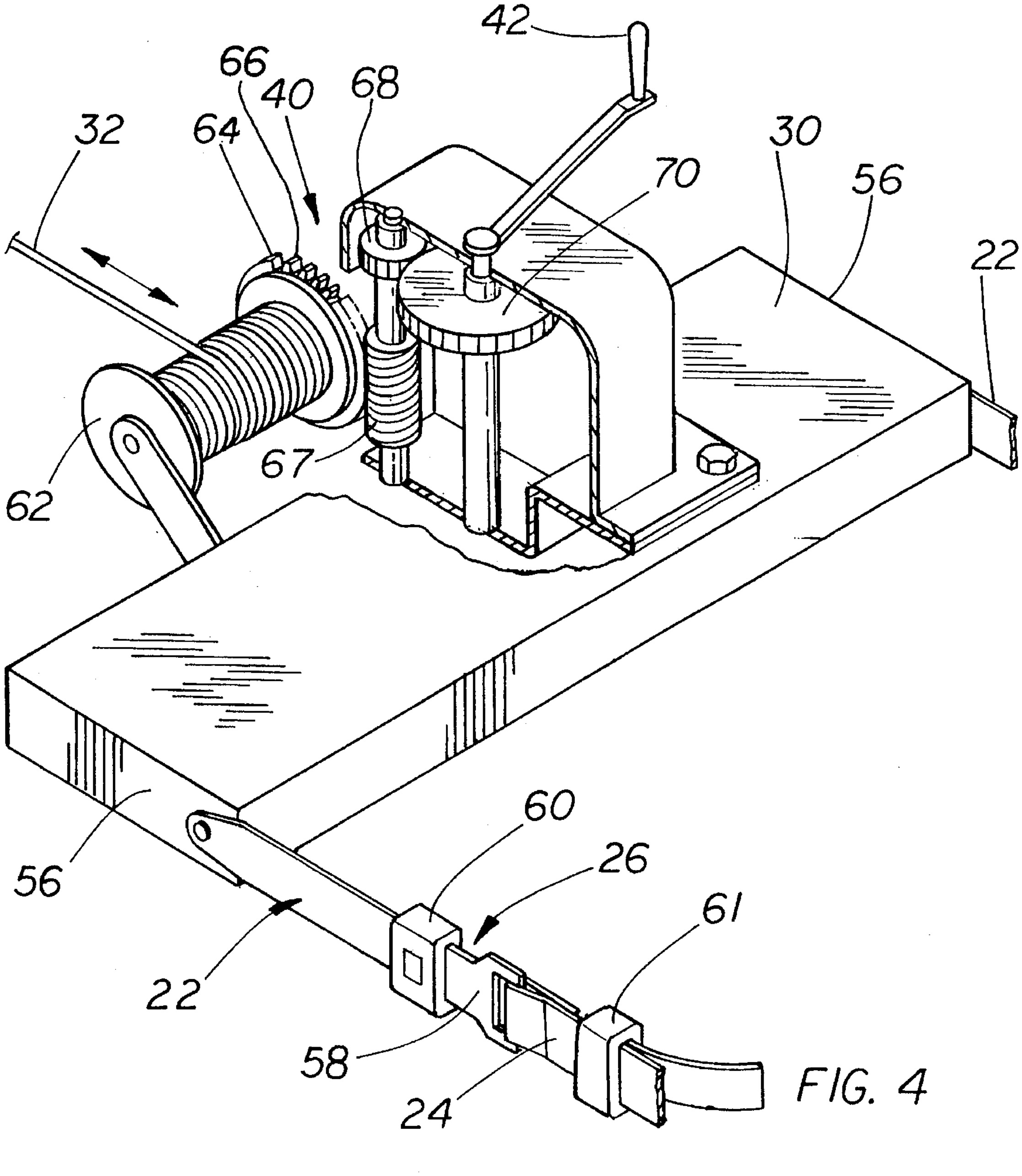
FIG. 4 is a partial perspective view of a spreader bar and winch.

In FIG. 4, there is shown a partial perspective view of the harness 22, which extends around the back of the chair (not shown) and is securely affixed to either end 56 of the spreader bar 30. Preferably, the harness 22 is made of seat belt material. The connector 26 has a male attachment 58 and a female attachment 60 (only one of which is shown) on each side of the spreader bar so that the spreader bar can be removably connected to the rest of the harness 22. If desired, the rest of the harness extending around the back of the chair can be left on the chair at all times. An adjustment bracket 61 (only one of which is shown) is located on each side of the harness so that the length of the harness can be lengthened or shortened to suit the needs of the wheelchair occupant. Whether the winch is manually operated or power operated, the occupant will want the spreader bar to be conveniently located. The bracket 61 is conventional and can be eliminated by using an adjustable bracket for the male attachment 58. In other words, the adjustable bracket 61 can be combined with the male attachment 58 into one component. A combined bracket is also conventional and is commonly used for the seatbelt in the middle of the rear seat in a motor vehicle to adjust the length of the belt. The winch 40 has a drum 62 upon which the cable 32 is wound. One end of the drum 62 has a gear 64 thereon having teeth 66. The teeth 66 are only partially shown but are sized and spaced to fit within threads of a worm gear 67. The worm gear is connected through horizontal gears 68, 70 to the handle 42. The purpose of the horizontal gears 68, 70 is to give a high turning ratio between the handle and the worm gear so that the worm gear revolves many times for each single revolution of the handle. The worm gear is designed so that if the wheelchair occupant releases the handle at any time during the ascent or descent of the stairs, the cable will not unwind on its own. A mechanical advantage of 50:1 (i.e. 1 pound of force on the handle results in 50 pounds of pull on the cable) is considered appropriate but a higher or lower ratio could be used depending on the physical ability and manual dexterity of the wheelchair occupant. Preferably, the drum 62 is at a level so that it is slightly below the level of the spreader bar 30. As the drum moves from being empty to being nearly full, the spreader bar will tilt slightly in order for the harness 22 to be aligned with an imaginary line aligned with the cable 32.

Figure 5:
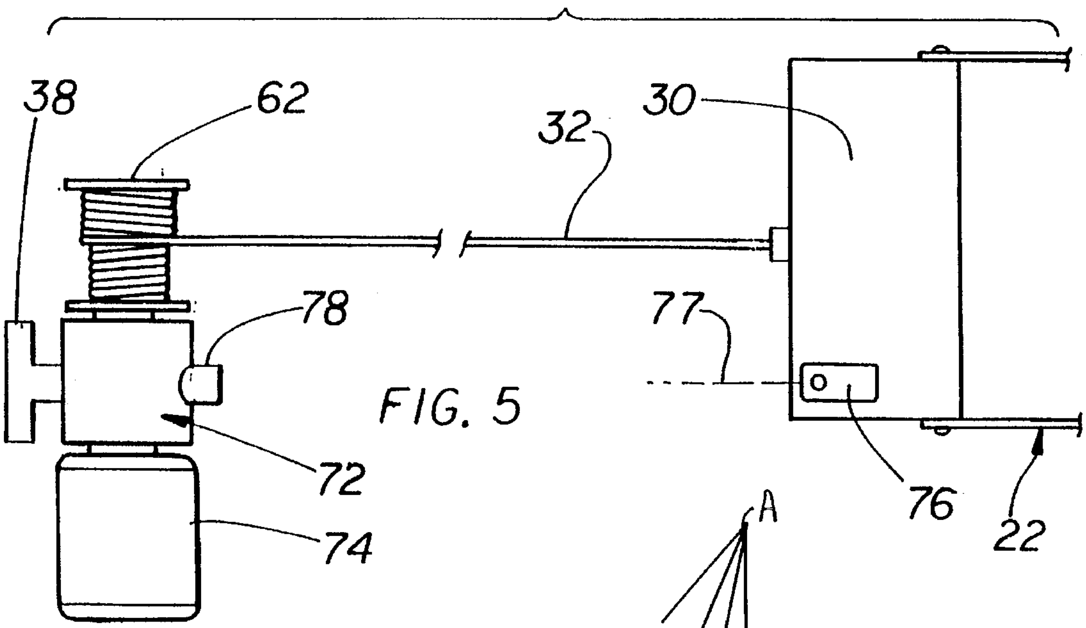
FIG. 5 is a top view of a motorized winch with a remote control on the spreader bar.

In a further embodiment of a cable system 71 of the invention shown in FIG. 5, a motorized winch 72 is used. The motorized winch is anchored above and beyond the upper level 8 in a conventional manner by anchor 38 and has an electric motor 74 thereon. The harness 22 and spreader bar 30 are virtually identical to that shown in FIGS. 2 and 4 except that the winch 40 is replaced by control means 76. The control means 76 is preferably a battery operated remote control that sends an electronic signal to receiving means 78 on the motorized winch 72. The remote control can cause the motor to retract the cable, extend the cable or simply to stop. The remote control 76 can be designed so that a button on the control means must be continuously depressed in order for the cable to either wind or unwind. With this feature, if the wheelchair occupant loses consciousness, the ascent or descent of the chair will stop. Additionally, the system can have conventional gates or switches to automatically stop the motor when the wheelchair reaches the upper or lower levels.

Figure 6:
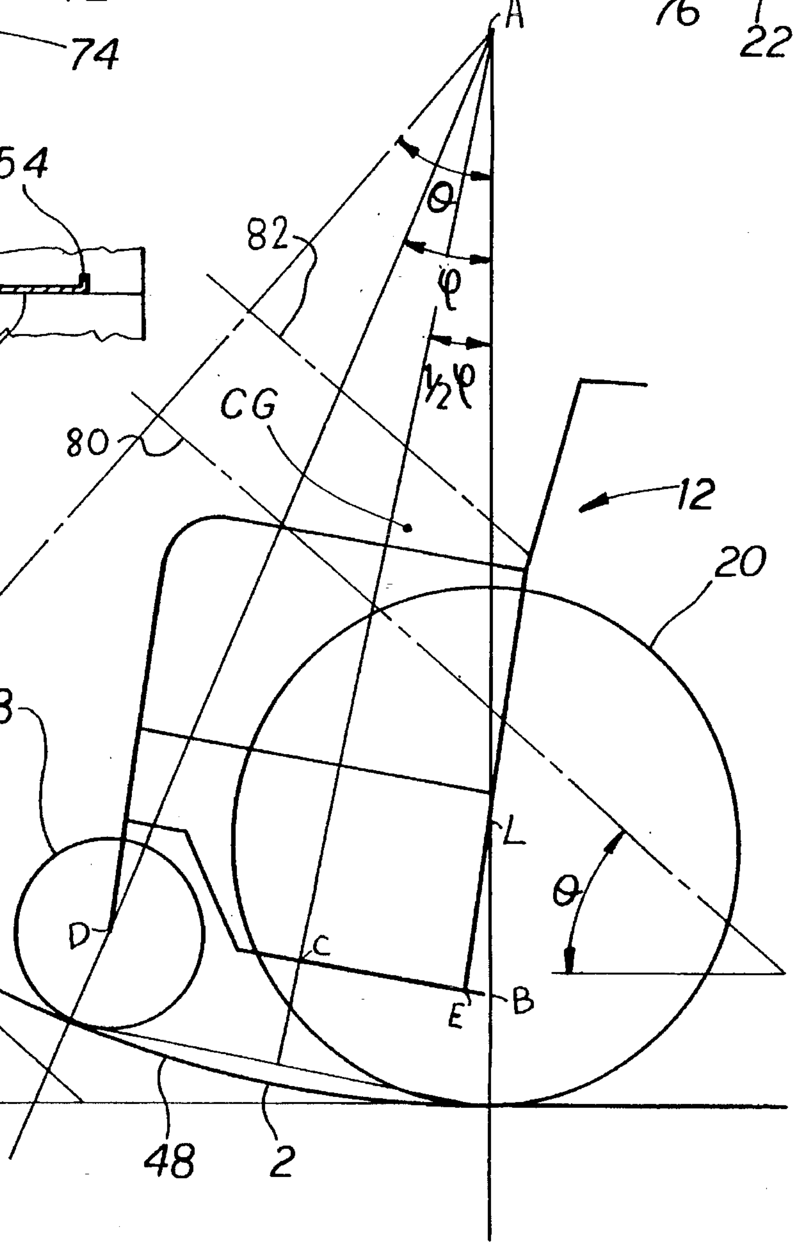
FIG. 6 is a schematic side view of a wheelchair on a transition section of track.

In FIG. 6, there is shown a schematic side view of a wheelchair on a transition section 48 of the tracks, the transition section having a vertical radius of 48". While the 48" radius works very well for this particular chair and occupant (in that the chair is extremely stable) and for this particular angle of stairs, a larger radius may be required to provide some level of stability for other chairs, occupants or angle of stairs. On the other hand, for some occupants, wheelchairs and stairs, a vertical radius of less than 48" will be sufficient. The transition section is required when an occupant wishes to ascend or descend the stairs without assistance. When a second person can assist the occupant by walking behind the chair holding onto the handles during ascent and descent, no transition section is required. When a transition section is used, a wheelchair occupant can move the wheelchair up or down the tracks without assistance. It is believed that a 48" vertical radius for the transition section is sufficiently large to safely accommodate most wheelchairs and occupants. The larger the vertical radius of the transition section, the more stable the occupied chair will be. However, the larger the radius, the more space at the base of the stairs that will be required. For institutional or commercial installations of the device, it is suggested that a transition section having a 60" vertical radius be used.

The remote control 76 is preferably designed to be rechargeable so that the batteries are always fully charged after each use. An angle θ of the stairs is 41° and a proposed angle θ of the cable, which will be parallel to the tracks when the chair is on the main slope will also be 41°. (The angle of the stairs will vary from location to location). The pull cable is substantially aligned with the center of gravity CG of the occupied chair when the chair is on the main slope and is substantially parallel to the main slope. In other words, an imaginary line 80 along the pull cable will extend substantially through the center of gravity of the occupied chair. If the imaginary line through the pull cable does not extend exactly through the center of gravity, it is sufficient if the imaginary line extends substantially through the center of gravity (i.e. in a range from slightly below the center of gravity to within 6" above the center of gravity). When the occupied wheelchair starts into the transition section, the imaginary line 82 along the pull cable will be above the imaginary line 80. As the wheelchair moves forward the imaginary line 82 will move downward until the wheelchair is fully on the main slope when it will be aligned with the imaginary line 80.

The center of gravity of the occupied chair was determined when the occupied chair was on a horizontal surface to be 11" to the rear of a vertical line through the axle of the front wheel and 25.5" above the horizontal surface in the center of the chair. The horizontal distance between the axles of the front and rear wheels of the particular chair being measured was 16". Thus, it can be seen that the center of gravity is closer to the rear of the chair than to the front of the chair. Obviously, the center of gravity will vary for wheelchairs of different sizes and shapes and will vary for different occupants of the same chair. The center of gravity will also vary depending on the position of the occupant in the chair. When measuring the center of gravity, the occupant should be requested to sit in a normal position against the back of the chair as gravity will force the occupant to be against the back of the chair when the chair is on the main slope. The occupant should also sit in the center of the chair.

In order to determine the center of gravity, we must first know the weight of the occupant and the chair. For example, assuming that an occupant and the wheelchair weighs 250 pounds and the force measured at the front wheels is 77.59 pounds and the force measured at the rear wheels is 172.41 pounds when the occupied chair is on a horizontal surface, if the distance to the rear of the front wheels is x, then:

$77.59x = 172.41\ (16-x).$

Therefore, x=11.0 (rounded off).

Next, the occupied chair is tilted backward until the load balances on the rear axle. Let us assume that the chair is at an angle of 20° to the horizontal when the chair balances. It is known that the center of gravity of the occupied chair is on a vertical line through the rear axle when the chair balances. It is also known that the center of gravity is on a vertical line 11" to the rear of the front axle when the chair is on a horizontal surface. With the occupant sitting in the center of the chair, the intersection of these two lines in the center (equidistant from each side) of the chair is the location of the center of gravity.

When the chair is on the transition section, an angle θ between the start of the transition section on the lower level 10 and the end of the transition section (i.e. where it meets the main slope) is also 41°. An angle ψ between the front and rear axles of the chair is approximately 23°. One-half ψ is the angle between the perpendicular of the chord (extending between a base of the front wheel 18 and the rear wheel 20). The angle ½ ψ has been calculated to be approximately 11.5°. It should be noted that the chair 12 as shown in FIG. 6 is of a slightly different design than the chair shown in FIGS. 1 and 2. It also should be noted that the center of gravity of the chair 12 and occupant (not shown in FIG. 6) in FIG. 6 is shown as being slightly above the sides of the chair and is different from the centers of gravity of the occupied chair in FIGS. 1 and 2.

ψ can be calculated as follows:

Sin ½ ψ=chord DC÷AD.

Since AD equals 44", chord DC equals 44 sin ½ ψ.

Sin ½=chord EB÷chord LB (L is axle of wheel 20).

Since LB equals 8", chord EB equals 8 sin ½ ψ

Chord DB=16"+8 sin ½ ψ.

Chord DB=2 chord DC=88 sin ½ ψ.

Therefore 16+8 sin ½ ψ equals 88 sin ½ ψ.

Sin ½ ψ=16÷80=0.2 ψ.

½ ψ=11° 32' 13".

ψ=23° 4' 26".

Where $R_1$ is the reaction force of the track at the front wheels and $R_2$ is the reaction force of the track at the rear wheels, the pull of the cable and the reaction forces can be calculated as follows:

Sin 41°=0.656.

P=0.656×250 pounds=164 pounds (where P is equal to the pull force of the cable).

Cos 41°=0.755.

$R_1+R_2=0.755\times 250=188.75$.

For the chair to have the same weight distribution as it does on a horizontal surface, $R_1\times 11=R_2\times 5$.

$R_1=59.05$ pounds.

$R_2=129.7$ pounds.

To determine the critical value of $R_1$ and $R_2$, assume $R_1=0$.

Therefore, $R_2$ equals 188.75.

Let y equal the distance of the pull cable above the center of gravity.

Therefore, for the front wheels, P (−y)=188.75×5.

Therefore, y=−(188.75×5)÷164.

y=−5.75.

Therefore, when the imaginary line through the pull cable is 5.75" below the center of gravity of the occupied chair, there will be zero downward force and zero upward force on the front wheels. If the harness moves any lower, the chair will tip over backwards.

For the rear wheels, $R_2=0$ and $R_1=188.75$.

Py=188.75×11.

y=(188.75×11)÷164.

y=12.66".

Therefore, when the imaginary line through the pull cable is 12.66" above the center of gravity of the occupied chair, there will be no downward force and no upward force on the rear wheels. If the pull cable moves any higher, the chair will tip over frontward.

The median of these two extremes is 3.45" above the center of gravity.

The harness 22 can therefore be secured to the back of the chair at that level and the cable can be anchored above and beyond the upper level so that it will be parallel to the main slope and an imaginary line through the cable will extend 3.45" above the center of gravity when the chair and occupant are on the main slope. While the pull cable could be higher or lower, because of the extreme importance of maintaining the chair and occupant in a stable position at all times, the extremes of the range should be avoided.

When the chair is in the position shown in FIG. 6, the forces on the front wheels ($R'_1$), the rear wheels ($R'_2$) and the pull cable P to ensure that the chair is stable on the transition section. These forces can be calculated in different ways. One way is to scale the moments about the center of gravity from the drawing. The moment for $R'_1$ is 6.25" clockwise, $R'_2$ is 2.25" counterclockwise and P is 2.125" counterclockwise.

The angle of the pull line (along the imaginary line 82) as the rear wheels of the chair start into the transition section is 38° 19'. For every action, there is an equal and opposite reaction.

The vertical component of the pull on the line is equal to P sin 38° 19'=0.62 P.

The horizontal component of the pull on the cable is equal to P cos 38° 19'=0.7846 P.

$R'_1$ is at an angle of 22° 49'49" to the vertical and has a vertical component of $R'_1$ cos 22° 49' 49"=0.922 $R'_1$. $R'_1$ has a horizontal component of $R'_1$ sin 22° 49'49"=0.388 $R'_1$.

For horizontal balance:

0.7846 P=0.388 $R'_1$.

For vertical balance:

$R'_2$+0.62 P+0.922 $R'_1$=250 pounds

For the moment balance:

2.125 P+2.25 $R'_2$=6.25 $R'_1$.

From the above three equations, it can be determined that:

$R'_1$=70.64 pounds (where $R'_1$ is the force on the front wheels);

$R'_2$=163.178 pounds (where $R'_1$ is the force on the rear wheels);

P=34.93 pounds (where P is the pulling force of the cable).

Since all of these forces are substantial positive values, the wheelchair and occupant are quite stable. Since the rear wheel has just started into the transition section, it is still on a horizontal surface. At this point, the spreader bar will be pulled by the cable to its highest point above the chair. As the chair advances through the transition section, the spreader bar will move steadily lower relative to the chair until the wheelchair is on the main slope when the spreader bar will be at its lowest position substantially through the center of gravity of the occupant and the wheelchair.

Figure 7:
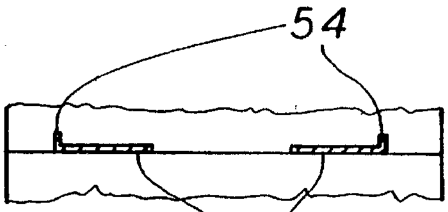
FIG. 7 is a cross-sectional view of said tracks along the lines 7—7 of FIG. 3.

In FIG. 7, there is shown a cross-sectional view of the tracks 2, 4. Each track has a horizontal surface 87 upon which the wheels ride and a vertical outer edge 54 along the outer edge of each track, the vertical outer edge acting as guide means to prevent the chair from falling off the tracks. Preferably, the vertical outer edge 54 is approximately 1" in height and the surface 87 is approximately 7.5" wide with a 10" space between the two tracks to allow a person to walk up or down the stairs between the tracks when the tracks are in place. The vertical edge 54 could be higher than 1", for example, 4", so long as the tracks are far enough apart to accommodate-the hand rail that extends around each of the rear wheels. This is beneficial when the wheelchair occupant initially uses the system as a person can walk behind the chair during the ascent or descent of the stairs in order to assure that the system is working properly. It is also useful in that the stairs can still be used when the tracks are in place. The tracks can be made of any suitable material but are preferably made of aluminum.

Shields have been omitted from the drawings so that the interior of the manual winch and power winch are exposed. The system could have safety switches added to it whereby the power winch will stop when the chair reaches a certain point on the upper level during an ascent and a certain point on the lower level during a descent.

The system and method of the present invention can be used by an occupant of a wheelchair to ascend or descend a flight of stairs without assistance. The system and method are particularly suited for residential use but could also be used in commercial settings or institutionally. It is believed that a user will find it convenient to leave that part of the harness that extends around the back of the chair on the chair at all times. If the system and method were used commercially or institutionally, it would be essential that all of the users would have had the center of gravity of their occupied wheelchair predetermined and the harness installed at the appropriate height. The spreader bar and cable could then be made available by the institution for connection onto the harnesses of the various users. For institutional or commercial use, a power winch is preferred. Also, transport means would be necessary so that the lower end of the cable and the spreader bar can be moved to either the upper or lower level by an occupant at the opposite level. In other words, if the lower end of the cable and the spreader bar were located at the upper level because the system had been used by a previous user, a second user at the lower level would activate the transport means to return the lower end of the cable and the spreader bar to the lower level. The transition section would have to have a large vertical radius to accommodate wide variances in the center of gravity between different wheelchairs and occupants.

When a wheelchair occupant wishes to use the system and the center of gravity and height of the harness has already been determined, the occupant will first insert the harness in the appropriate brackets around the back of the wheelchair if that has not already been done. Next, the wheelchair occupant will use the seatbelt connectors to connect the spreader bar to the harness. The cable will already be connected to the spreader bar. Assuming that the occupant is at the lower level, the occupant will then orient the wheelchair so that it is aligned in a forward direction with the transitional portion of the tracks. The spreader bar and lower end of the cable should be stored in a convenient location at the lower level so that it is reachable by the wheelchair occupant. Obviously, the physical ability of the wheelchair occupant will vary widely and the manner in which these items are located within reach of the occupant will vary depending on those abilities.

If the occupant has a manual system, the occupant will then turn the handle to begin advancing the chair in a forward direction onto the transition section and ultimately onto the main slope of the tracks. When the chair is on the transition section, the spreader bar will be well above the center of gravity. When the chair is on the main slope of the tracks, the spreader bar and cable will be substantially aligned with the center of gravity of the occupied chair. When the second level is reached and the rear wheels are resting on the second level, the occupant will stop turning the handle. The occupant will then disconnect the spreader bar from the remaining parts of the harness by disconnecting the seatbelt connectors. Both the lower end of the cable and the spreader bar will be stored in a convenient location at the upper level so that they will be readily accessible to the wheelchair occupant when the occupant wishes to descend the stairs. If desired, the occupant could leave the lower end of the cable connected directly to the spreader bar and store these two items in that manner at both the upper level and the lower level.

When the occupant desires to descend the stairs, the occupant would proceed in generally the opposite manner to the ascent. First, the occupant would orient the wheelchair so that it was aligned with the tracks on the upper level so that it can proceed backwards down the tracks with the rear wheels first.

Next, the spreader bar, with the cable attached to the winding means, would be connected to the harness. Then, the occupant may have to turn the crank to adjust the slack in the cable so that there is just enough slack to allow the rear wheels to proceed slightly down the main slope before the cable becomes taut. From that point on, the occupant will turn the handle in an appropriate direction to extend the cable until the wheelchair rests on the lower level. When that occurs, the lower end of the cable and spreader bar are disconnected and stored for future use. It is important that the winding means be designed so that it is not free wheeling. In other words, if the occupant releases the handle at any time while the wheelchair is on the tracks, it is important that the cable will not extend or unravel due to the weight of the chair and occupant. There are various designs that will be suitable and the use of a worm gear shown in the drawings is only one such design.

When the winch is power operated, the method of ascending or descending the stairs is virtually the same in that the spreader bar, with the cable attached, must be connected to the wheelchair. However, instead of turning the handle, the wheelchair occupant would simply press the appropriate button on the remote control to retract or extend the cable in order to move up or down the tracks respectively. The remote control can be designed so that the button must be continually depressed in order for the motor to operate or it could simply be designed so that the motor will operate in the appropriate direction when the button is depressed once. Preferably, the motor of the power winch has a variable speed and the control means or remote can be operated to vary the speed of the motor. In the transition section, it is suggested that the motor be operated so that the chair moves more slowly than it would on the main slope. When the power winch is used, it is suggested that appropriate gates or switches be installed at the upper and lower levels to stop the winch when the chair reaches a certain point on the upper and lower levels. These gates and switches are conventional and can be similar to the safety gate used on ski tows.

Preferably, the spreader bar will always be stored with the cable connected. When the manual winding means is used, the lower end of the cable will always be at least partially wound around the winding means. With the power winch, the winch is preferably located at the anchor and the lower end of the cable could be designed to be connected and disconnected during each use of the chair. However, it is preferable that that lower end of the cable always be connected to the spreader bar as this is much more convenient for the occupant. While the system and method of the present invention are designed to be used by a wheelchair occupant without outside assistance, there may be situations where it is preferable or necessary to have someone assist the wheelchair occupant in using the device. For example, the wheelchair occupant may not have sufficient physical ability to operate the system. As another example, the particular location where the system is installed may not have sufficient space available for a transition section. As still another example, if the system is used commercially or institutionally and has a high rate of usage, it may be preferable to have an assistant present at all times to speed up the operation of the device and to make sure that those wanting to use the device have the ability to do so.

The method has intentionally excluded those times during the operation where the wheelchair occupant will apply or release the brakes on the wheelchair. For example, the wheelchair occupant should have the brakes on on the wheelchair at both levels when the spreader bar is being connected to the harness and when the lower end of the cable is being connected to the spreader bar. The brakes will then be released before activating the winch. While the spreader bar is described as being connected to the harness which extends around the back of the chair, the spreader bar could be connected to the chair in various ways so long as the connection is secure and results in the cable being substantially aligned with the center of gravity of the chair and occupant when the chair is on the main slope. The spreader bar itself could be replaced with some other means of connecting the cable to the chair in a secure manner at the appropriate height.

What I claim as my invention is:

1. A method of moving a wheelchair occupied by an occupant between an upper level and a lower level, said wheelchair having a front, two front wheels, two rear wheels, a seat and a back, said wheelchair moving along tracks having a main slope, said tracks being spaced apart so that each track receives a front wheel and rear wheel of said chair, said tracks having guide means thereon to prevent the chair from slipping off either of said tracks, winding means that can be removably secured to said chair, a cable having an upper end and a lower end, said lower end being connected to said winding means and said upper end being securely anchored above and beyond said upper level, said upper end being anchored and said winding means being secured to said chair at a height so that said cable is substantially parallel to said main slope and substantially aligned with said center of gravity of said chair and occupant when said chair is on said main slope, said method comprising:

(a) commencing with the chair at the lower level, moving said chair to align said front wheels of said chair with said tracks, connecting said cable and said winding means to said chair, operating said winding means to tighten said cable until said cable is taut, continuing to operate said winding means to retract said cable and to pull said chair in a forward motion onto said tracks and gently up said main slope, with said cable substantially parallel to said tracks, until said chair exits from said tracks onto said upper level, releasing said cable and said winding means from said chair;

(b) commencing with the chair at said upper level, orienting said chair to align said rear wheels of said chair with said tracks and backing said chair towards said tracks, attaching said cable and said winding means to said chair at a height substantially through a center of gravity of said chair and said occupant, operating said winding means to extend said cable slightly, moving said chair backward along said tracks until rear wheels of said chair are on said main slope, when said cable is taut further operating said winding means to extend said cable to allow said chair to move rearwards gently down said main slope with said cable substantially parallel to said main slope until said chair exits from said tracks onto said lower level, releasing said cable and said winding means from said chair.

2. A method as claimed in claim 1 wherein said winding means is connected to a harness on said chair and said method includes the steps of connecting said harness to said chair, connecting said winding means to said harness before moving said wheelchair up or down said tracks and disconnecting said winding means from said harness and disconnecting said harness from said chair after moving said wheelchair up or down said tracks.

3. A method as claimed in claim 1 wherein said winding means is connected to a harness on said chair and said method includes the steps of connecting said winding means to said harness before moving said wheelchair up or down said tracks and disconnecting said winding means from said harness after moving said wheelchair up or down said tracks.

4. A method as claimed in claim 2 wherein the harness is connected to a spreader bar, the harness extending along the back of said chair at a height so that the pull cable is substantially through a center of gravity of said occupant and said chair when said chair is on the main slope of said tracks, said winding means being connected to said spreader bar, said method including the steps of connecting said spreader bar to said harness before moving the wheelchair on said tracks and disconnecting said spreader bar from said harness after moving the wheelchair on said tracks.

5. A method as claimed in any one of claims 1, 2 or 3 wherein said tracks are curved near said lower level to provide a transition section between said lower level and said main slope of said tracks, said method including the steps of using said cable to move said wheelchair through said transition section when moving up or down said tracks, said transition section having a lesser slope than said main slope.

6. A method of moving a wheelchair occupied by an occupant between an upper level and a lower level, said wheelchair having a front, two front wheels, two rear wheels, a seat and a back, said wheelchair having retention means removably mounted thereon, said wheelchair moving along tracks having a main slope, said tracks being spaced apart so that each track receives a front wheel and a rear wheel of said chair, said tracks having guide means thereon to prevent said chair from slipping off either of said tracks, a cable having an upper end and a lower end, said upper end being anchored above and beyond said upper level, said lower end being connected to said retention means so that said cable is substantially parallel to said main slope and is substantially aligned with a center of gravity of said chair and said occupant when said chair is on said main slope, said cable being connected to motorized winding means, with control means for said winding means, said method comprising:

(a) commencing with the chair at the lower level, moving said chair to align said front wheels of said chair with said tracks, connecting said retention means to said chair, operating said control means to cause said winding means to retract said cable until said cable is taut, continuing to operate said control means to cause said winding means to retract said cable to pull said chair in a forward motion onto said tracks and gently up said main slope with said cable substantially parallel to said tracks until said chair exits from said tracks onto said upper level and releasing said retention means from said chair;

(b) commencing with the chair at said upper level, orienting said chair to align said rear wheels of said chair with said tracks and backing said chair towards said tracks, connecting said retention means to said chair, operating said control means so that said cable has a small amount of slack, moving said wheelchair onto said tracks so that said rear wheels move slightly down said main slope as said cable becomes taut, operating said control means to extend said cable to allow said wheelchair to move rearward gently down said main slope until said chair exits from said tracks onto said lower level and releasing said retention means from said chair.

7. A method as claimed in claim 6 wherein said retention means is a spreader bar removably connected to a harness, said harness extending around said back of said chair, said method including the steps of connecting said spreader bar which is connected to said cable to said harness before moving said wheelchair on said tracks and disconnecting said spreader bar from said harness after moving said wheelchair on said tracks.

8. A method as claimed in claim 7 wherein the motorized winch has a variable speed and the control means is able to vary said speed of said winch, said method including the steps of operating said control means to move slowly through said transition section and more quickly on said main slope.

9. A wheelchair moving system for moving a wheelchair occupant between an upper level and a lower level, said system comprising a wheelchair moving along sloped tracks, said tracks having a main slope, said tracks being spaced apart from one another so that each track receives a front wheel and a rear wheel of said chair, said tracks having guide means thereon to prevent the chair from slipping off either of said tracks, said chair having a seat and back, said system comprising said tracks together with a winding means and cable, said cable having an upper end and a lower end, said lower end being connected to said winding means, said winding means being removably connected to said chair, said upper end being connected to an anchor above and beyond said upper level so that said cable is substantially parallel to a main slope of said tracks when said chair is on said main slope and said cable is adapted to be substantially aligned with a center of gravity of said occupant and said chair.

10. A system as claimed in claim 9 wherein said tracks have a transition section located between said main slope and said lower level, said transition section having a lesser slope than said main slope to provide a smooth transition between said lower level and said main slope.

11. A system as claimed in claim 9 wherein said tracks are spaced apart from one another by at least 10".

12. A system as claimed in claim 11 wherein said winding means is connected to retention means which in turn is connected to said chair.

13. A system as claimed in claim 12 wherein the retention means is a spreader bar removably connected to a harness, said harness extending around said back of said chair, said winding means being connected to said spreader bar.

14. A system as claimed in claim 13 wherein the tracks are mounted along a set of stairs, said tracks being far enough apart to permit a non-occupant of said chair to walk comfortably up and down said stairs between said tracks.

15. A system as claimed in claim 14 wherein the tracks are angle irons that have a vertical angle along an outer surface thereof, said vertical angle being guide means for said wheels of said chair.

16. A system as claimed in claim 15 wherein the winding means is a manually operated winch having a handle that is adapted to be disposed immediately in front of said occupant when said chair is moving up or down said stairs.

17. A system as claimed in claim 16 wherein the transition section has a vertical radius of substantially 48".

18. A system as claimed in claim 17 wherein the transition section is a series of segments extending between said lower level and said main slope.

19. A system as claimed in claim 16 wherein the substantially aligned cable is adapted to be located within a range of slightly below the center of gravity of the wheelchair and occupant to 6" above said center of gravity.

20. A wheelchair moving system for moving a wheelchair occupant between an upper level and a lower level, said system comprising a wheelchair moving along sloped tracks, said tracks being spaced apart from one another so that each track receives a front wheel and a rear wheel of said chair, said tracks having guide means thereon to prevent the chair from slipping off either of said tracks, said chair having a seat and back, said system comprising said tracks together with retention means, winding means, control means and a cable, said retention means being connected to said chair, said cable having an upper end and a lower end, with said lower end being connected to said retention means, said upper end being anchored above and beyond said second level so that as the chair moves up or down said tracks on said main slope, said cable is substantially parallel to said tracks and is adapted to be substantially aligned with a center of gravity of said chair and said occupant, said winding means being motorized, said control means controlling said winding means to retract or extend said cable.

21. A system as claimed in claim 20 wherein the tracks have a transition section at a lower end thereof, said transition section having a lesser slope than said main slope.

22. A system as claimed in claim 21 wherein the transition section has a vertical radius of substantially 48".

23. A system as claimed in claim 21 wherein the winding means is a motorized winch and has a variable speed and said control means can vary said speed.

24. A system as claimed in claim 23 wherein the control means is a remote control and the winding means is located at an upper end of said cable.

25. A system as claimed in claim 21 wherein the retention means is a harness removably connected to a spreader bar, said harness extending around said back of said chair, said lower end of said cable being connected to said spreader bar, said control means being located to be accessible to the occupant of said chair.

26. A system as claimed in claim 21 wherein the substantially aligned cable is adapted to be located within a range of slightly below the center of gravity of the wheelchair and occupant to 6" above said center of gravity.

27. A wheelchair moving system for moving a wheelchair occupant between an upper level and a lower level, said system comprising a wheelchair moving along sloped tracks, said tracks having a main slope, said tracks being spaced apart from one another so that each track receives a front wheel and a rear wheel of said chair, said chair having a seat and back, said system comprising said tracks together with a winding means and cable, said cable having an upper end and a lower end, said lower end being connected to said winding means, said winding means being removably connected to said chair, said upper end being connected to an anchor above and beyond said upper level so that said cable is substantially parallel to a main slope of said tracks when said chair is on said main slope and said cable is adapted to be within a reasonable range of alignment with a center of gravity of said occupant and said chair so that said chair is stable when said chair is on said main slope.

28. A system as claimed in claim 27 wherein said winding means is connected to retention means which in turn is connected to said chair.

29. A system as claimed in claim 27 wherein there are guide means between said chair and said tracks to prevent said chair from slipping off either of said tracks.

30. A method of moving a wheelchair occupied by an occupant between an upper level and a lower level, said wheelchair having a front, two front wheels, two rear wheels, a seat and a back, said wheelchair moving along tracks having a main slope, said tracks being spaced apart so that each track receives a front wheel and rear wheel of said chair, winding means that can be removably secured to said chair, a cable having an upper end and a lower end, said lower end being connected to said winding means and said upper end being securely anchored above and beyond said upper level, said upper end being anchored and said winding means being secured to said chair at a height so that said cable is substantially parallel to said main slope and within a reasonable range of being aligned with said center of gravity of said chair and said occupant so that said chair is stable when said chair is on said main slope, said method comprising:

(a) commencing with the chair at the lower level, moving said chair to align said front wheels of said chair with said tracks, connecting said cable and said winding means to said chair, operating said winding means to tighten said cable until said cable is taut, continuing to operate said winding means to retract said cable and to pull said chair in a forward motion onto said tracks and gently up said main slope, with said cable substantially parallel to said tracks, until said chair exits from said tracks onto said upper level, releasing said cable and said winding means from said chair;

(b) commencing with the chair at said upper level, orienting said chair to align said rear wheels of said chair with said tracks and backing said chair towards said tracks, attaching said cable and said winding means to said chair at a height substantially through a center of gravity of said chair and said occupant, operating said winding means to extend said cable slightly, moving said chair backward along said tracks until rear wheels of said chair are on said main slope, when said cable is taut further operating said winding means to extend said cable to allow said chair to move rearwards gently down said main slope with said cable substantially parallel to said main slope until said chair exits from said tracks onto said lower level, releasing said cable and said winding means from said chair.

31. A method of moving a wheelchair occupied by an occupant between an upper level and a lower level, said wheelchair having a front, two front wheels, two rear wheels, a seat and a back, said wheelchair having retention means removably mounted thereon, said wheelchair moving along tracks having a main slope, said tracks being spaced apart so that each track receives a front wheel and a rear wheel of said chair, a cable having an upper end and a lower end, said upper end being anchored above and beyond said upper level, said lower end being connected to said retention means so that said cable is substantially parallel to said main slope and is within a reasonable range of alignment with a center of gravity of said chair and said occupant so that said chair is stable when said chair is on said main slope, said cable being connected to motorized winding means, with control means for said winding means, said method comprising;

(a) commencing with the chair at the lower level, moving said chair to align said front wheels of said chair with said tracks, connecting said retention means to said chair, operating said control means to cause said winding means to retract said cable until said cable is taut, continuing to operate said control means to cause said winding means to retract said cable to pull said chair in a forward motion onto said tracks and gently up said main slope with said cable substantially parallel to said tracks until said chair exits from said tracks onto said upper level and releasing said retention means from said chair;

(b) commencing with the chair at said upper level, orienting said chair to align said rear wheels of said chair with said tracks and backing said chair towards said tracks, connecting said retention means to said chair, operating said control means so that said cable has a small amount of slack, moving said wheelchair onto said tracks so that said rear wheels move slightly down said main slope as said cable becomes taut, operating said control means to extend said cable to allow said wheelchair to move rearward gently down said main slope until said chair exits from said tracks onto said lower level and releasing said retention means from said chair.

* * * * *